United States Patent Office 2,706,499
Patented Apr. 19, 1955

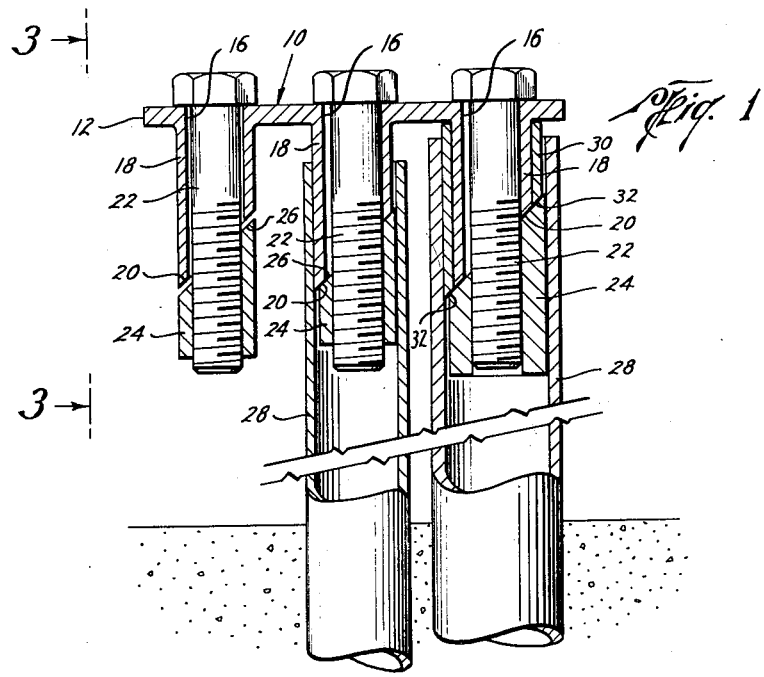
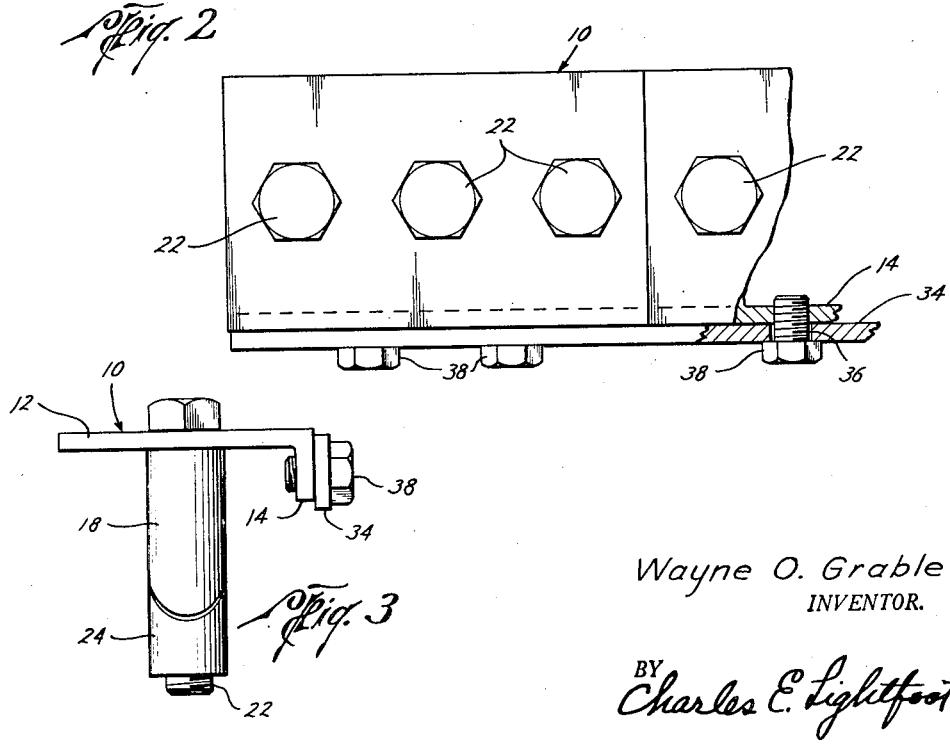

2,706,499

SPACING AND CLOSURE DEVICE FOR ELECTRICAL CONDUITS

Wayne O. Grable, Houston, Tex.

Application November 24, 1952, Serial No. 322,269

5 Claims. (Cl. 138—89)

This invention relates to a spacing and closure device for electrical conduits, and more particularly to a device adapted to be applied to the open ends of pipes or conduits for maintaining the same in predetermined spaced relation.

The invention finds particular application in connection with the installation of electrical wiring in the construction of buildings, in order to maintain the ends of electrical conduits in a predetermined spaced arrangement during the pouring of concrete slab foundations, and other preliminary construction work.

In the construction of buildings, as heretofore commonly practiced, it has been customary to lay a foundation in the form of a slab of reinforced concrete, serving as a support for, or as the floor of the structure, and before the pouring of the concrete various accessories such as water and gas pipes, or electrical conduits, are first placed in position to be enclosed in the slab. The ends of such pipes or conduits must frequently extend beyond the finished concrete for a considerable distance and be equally positioned for the attachment thereto of fixtures, which in the case of electrical conduits are in the form of electrical outlet boxes.

Heretofore, great loss of material and labor has often resulted due to the dislodgement or displacement of such pipes or conduits in the pouring of the concrete, making it necessary to reposition the end portions of the conduits, before the construction could be completed. At times the electrical outlet boxes have been positioned in place on the ends of the conduits and attached thereto to secure the conduits in the desired spaced relationship, and in laying the concrete such boxes are frequently damaged beyond repair, necessitating not only the repositioning of the ends of the conduits, but also the replacement of the boxes.

The present invention has for its chief object the overcoming of the above difficulties by the provision of a spacing and closure device adapted to close the open ends of pipes or conduits, and to clampingly engage the same to maintain the end portions of the same in predetermined spaced relationship.

A further object of the invention is the provision of a device of the kind referred to, which may be applied to pipes or conduits of different sizes, to effectively close the ends of the same against the entrance of foreign matter, and to hold the same in a predetermined spaced relationship.

Another object of the invention is to provide a spacing and closure device for pipes or conduits embodying clamping means engageable with the interiors of the pipes or conduits to securely clamp the device in position thereon.

Another object of the invention is to provide a spacing and closure device of the type mentioned, which includes a plate-like body and expandible clamping means carried thereby, adapted for insertion in the ends of pipes or conduits, and to be expanded into clamping engagement therewith, to close the ends of the pipes or conduits and securely maintain the same in a predetermined spaced relationship.

A still further object of the invention is the provision of a spacing and closure device for pipes or conduits, which is of simple design and rugged construction, capable of long withstanding the hard usage to which such articles are likely to be subjected.

The above and other important objects and advantages of the invention will best be understood from the following detailed description, constituting a specification of the invention, when considered in connection with the annexed drawings, wherein—

Figure 1 is a vertical, central, cross-sectional view of the invention, illustrating the application of the same to the ends of pipes or conduits;

Figure 2 is a top plan view of the invention, partially broken away, and partially in a cross-section, and showing the manner in which several of the devices may be connected together; and Figure 3 is an end elevational view of the invention as illustrated in Figure 1.

Referring now to the drawings in greater detail the invention comprises a plate-like body 10, which in the present illustration is of angular cross-section, having a main plate portion 12 provided with a flange 14 extending along one edge thereof. The body has spaced openings 16 therethrough, and is provided with tubular projections 18 surrounding the openings at one side of the main portion 12, which projections have their outer ends 20 disposed at an angle to the main plate portion 12. Suitable fastening means, such as the screw bolts 22 extend through the tubular projections, and a clamp nut 24 is threadably carried by each of the bolts, which nut is formed with a sloping end surface 26, engageable with the sloping end 20 of the corresponding projection 18.

The openings 16 of the body, and the internal diameters of the tubular projections are somewhat larger than the diameters of the bolts, so that upon tightening of the bolts the nuts 24 may move laterally on the sloping end surface 20, thus bringing the tubular projections and the nuts into clamping engagement with the interiors of the pipes or conduits into which they extend.

In making use of the invention, the end portions of the pipes or conduits, indicated at 26 and 28 in Figure 1, are arranged in properly spaced relationship whereupon by loosening the bolts 22, the clamp nuts 24 and tubular extensions 18 may be inserted in the open ends of the same, and upon tightening of the bolts the nuts will be drawn into contact with the sloping end surfaces 20 of the projections. When the bolts are tightened the nuts will move laterally on the end surfaces 20, thus expanding the device into clamping engagement with the interiors of the pipes or conduits, to close the same, and securely maintain the end portions of the pipes or conduits in predetermined spaced relationship.

The invention may also be adapted for use with pipes or conduits of different diameters by providing sleeves, such as that indicated at 30 in Figure 1, which sleeves may be of a length equal to that of the tubular projections, and formed with sloping end portions 32, corresponding to the sloping ends 20 of the projections. When such slabs are used the clamping nuts employed therewith are of substantially the same external diameter as that of the sleeves, so that upon application of the invention in the manner previously described the sleeves and nuts will be brought into clamping engagement with the interiors of the end portions of the pipes or conduits to clamp the device securingly in position thereon.

Several of the spacing and closure devices may be connected together if desirable or expedient, to close and maintain a large number of pipes or conduits in predetermined spaced relation. For this purpose the flanges 14 may be provided with suitably spaced, threaded openings therethrough, and a flat bar 34, or the like, having correspondingly spaced openings 36, may be positioned in contact with the flanges 14 of several of the devices, and secured thereto by means of suitable bolts 38. In this manner as many of the devices may be connected together in alignment as may be desired.

It will be understood, of course, that the body may be manufactured as an integral casting, or the tubular projections may be made as separate parts and attached to the main plate portion by welding, brazing or in any other suitable manner.

It will thus be seen that the invention as described above provides a simple and strongly constructed spacing and closure device which is easily applied to or removed from the open ends of pipes or conduits, and by which the end portions of the same may be rigidly secured in predetermined spaced relation and held therein against displacement or dislodgment during the pouring of the concrete or other construction work.

While the invention has been disclosed in connection with a certain specific embodiment of the same, it will be understood that this is intended by way of illustration only, and that various changes can be made in the arrangement and construction of the parts, without departing from the spirit of the invention, or the scope of the appeded claims.

Having thus clearly shown and described the invention, what is claimed as new and desired to secure by Letters Patent is:

1. A spacing and closure device for attachment to the open ends of conduits to hold said ends in predetermined spaced relation, said device comprising a plate-like body, and tubular means rigidly secured at one end to the body in spaced relation thereon and whose free ends are positioned for insertion in the ends of the conduits, and clamping means carried by the body and engageable with the free ends of said tubular means and with said conduits to secure the body to the conduits.

2. A spacing and closure device for attachment to the open ends of conduits to hold said ends in predetermined spaced relation, said device comprising a plate-like body, and tubular members rigidly secured at one end to the body in spaced relation thereon and whose free ends are positioned for insertion in the ends of the conduits, clamping elements carried by the body and including means engageable with the free ends of said members and the interiors of said conduits to secure the body to the conduits.

3. A spacing and closure device for attachment to the open ends of conduits to hold said ends in predetermined spaced relation, said device comprising a plate-like body, and tubular members rigidly secured at one end to the body in spaced relation thereon and whose free ends are positioned for insertion in the ends of the conduits, said free ends of said members having end surfaces disposed in angular relation to said body, clamping elements, means connecting the clamping elements to the body and operable to move the elements toward and away from the body, said elements having surface portions engageable with said end surfaces to cause said elements to move laterally on said members to clampingly engage said members and elements with said conduits upon movement of said members toward said body.

4. A spacing and closure device for attachment to the open ends of conduits to hold said ends in predetermined spaced relation, said device comprising a plate-like body, and tubular members rigidly secured at one end to the body in spaced relation thereon and whose free ends are positioned for insertion in the ends of the conduits, said free ends of said members having end surfaces disposed in angular relation to said body, a clamping element for each of said members, means movably carried by the body connecting the clamping elements to the body and operable to move the elements toward and away from the body, said elements having surface portions engageable with said end surfaces to move said elements in a direction to cause the elements and members to clampingly engage the conduits upon movement of the elements toward said body.

5. A spacing and closure device for attachment to the open ends of conduits to hold said ends in predetermined spaced relation, said device comprising a plate-like body having spaced apart openings therethrough, tubular members each secured at one end to the body in surrounding relation to one of said openings and whose other end is positioned for insertion in the end of a conduit, a bolt extending through each of said members and the corresponding opening, clamp nuts threadably carried on the bolts, said bolts being of smaller diameter than said openings and the internal diameters of said members to allow the bolts to move laterally in the members, said nuts and said members having surface portions engageable to cause the nuts and bolts to move laterally of the members to clampingly engage the members and nuts with the interiors of the conduits upon tightening of the bolts.

References Cited in the file of this patent

UNITED STATES PATENTS

| | | |
|---|---|---|
| 297,183 | Shelbourne | Apr. 22, 1884 |
| 1,757,196 | Jacques | May 6, 1930 |
| 2,648,439 | Miller | Aug. 11, 1953 |